United States Patent Office 3,446,542
Patented May 27, 1969

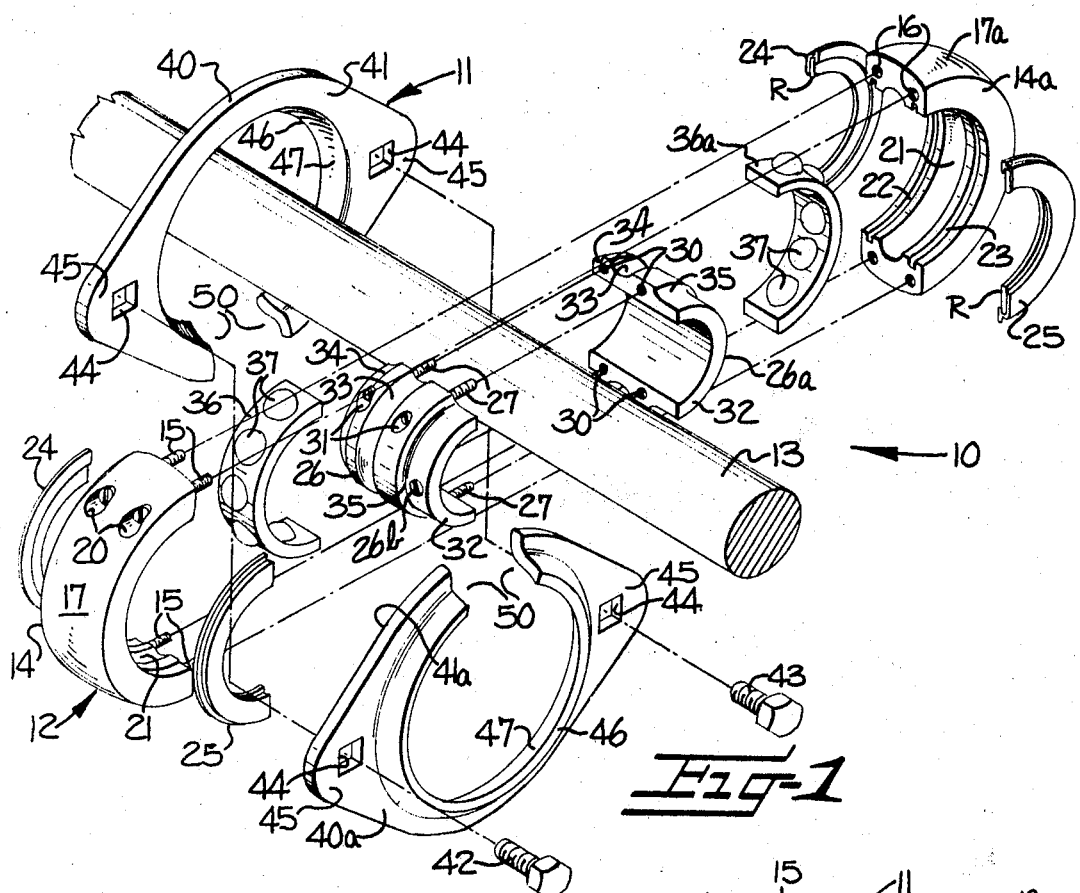
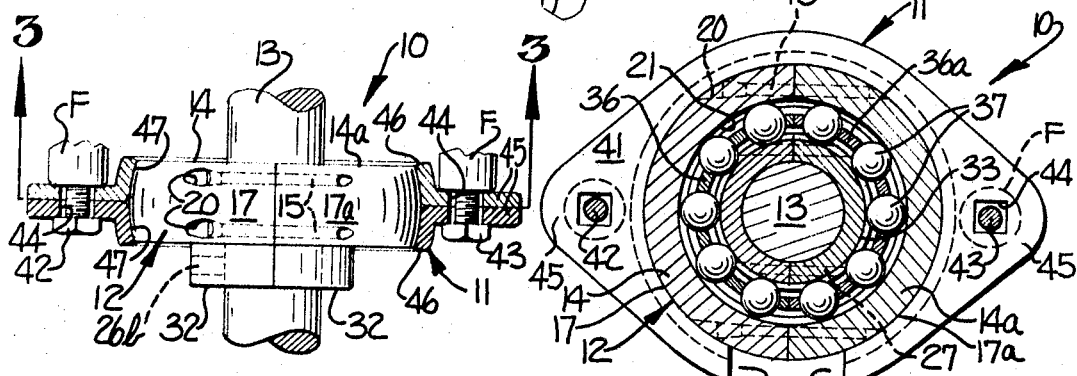

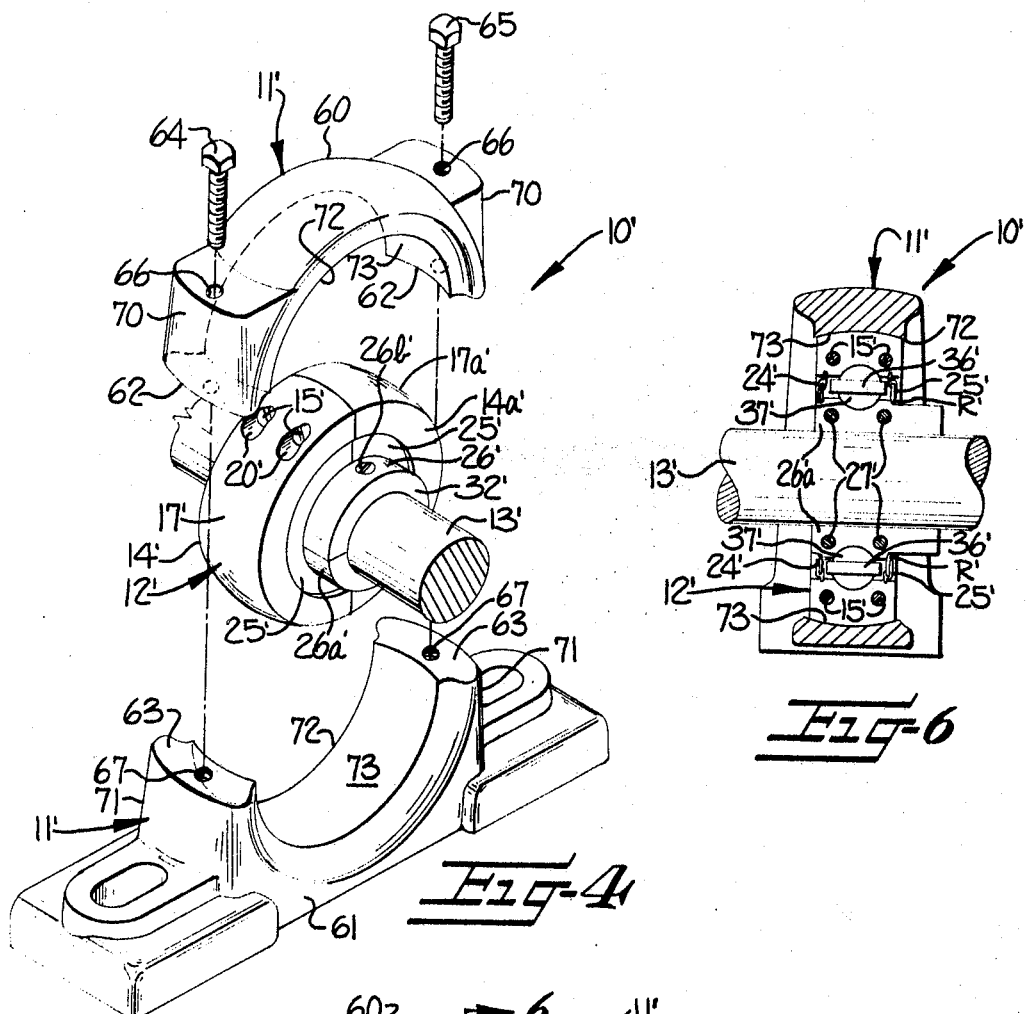

3,446,542
SPLIT SELF-ALIGNING BEARING ASSEMBLY
Joe Rufus Whitehurst, Bessemer City, N.C., assignor, by mesne assignments, to The Warner & Swasey Company, Cleveland, Ohio, a corporation of Ohio
Continuation-in-part of application Ser. No. 529,064, Feb. 21, 1966. This application Mar. 22, 1967, Ser. No. 625,219
Int. Cl. F16c *1/24, 33/78, 13/00*
U.S. Cl. 308—187.2                              5 Claims

ABSTRACT OF THE DISCLOSURE

A self-aligning antifriction bearing assembly including a radially split antifriction bearing with the split segments thereof releasably abutted and with the outer race thereof being convexly spherically curved. The bearing is supported by a split bearing mount having its split components releasably joined together about the bearing and having a concave bearing-receiving seat curved to mate with the curvature of the bearing outer race and slidably engaging therewith to permit relative movement between the bearing and the bearing mount.

---

This application is a continuation-in-part of my co-pending application Serial No. 529,064, filed February 21, 1966, now Patent No. 3,382,660, and entitled, "Roving Frame Spindle and Bobbin Shaft Mountings."

This invention relates to antifriction bearing assemblies. More particularly, it relates to a split antifriction bearing disposed in a split bearing mount for self alignment with the axis of rotation of a shaft rotatably supported thereby.

Machines of various types and uses include rotating shafts which are connected to or extend through a large number of other machine parts in complex assemblages. In such machines, installation or replacement of worn bearings for these shafts can prove difficult and expensive because of the necessity during bearing replacement of passing the bearings over an end of the shaft, which frequently requires extensive disassembly of the machine. Moreover, precise alignment of the bearings with the axis of rotation of the shaft, while essential to satisfactory performance thereof, is always difficult to attain, usually requiring meticulous placement of the supporting bearing mount relative both to the bearing and to the shaft.

It is an object of this invention to provide a bearing assembly in which an annular antifriction bearing may be installed on or removed from a shaft without being passed over either end thereof, and in which a bearing mount supports the antifriction bearing for self alignment thereof with the axis of rotation of a shaft extending therethrough.

It is a more specific object of this invention to provide a split antifriction bearing disposed in self-aligning relationship with a split bearing mount for rotatably supporting a shaft through the axis of the bearing.

Some of the objects of the invention having been stated, other objects will appear as the description proceeds, when taken in connection with the accompanying drawings, in which—

FIGURE 1 is an exploded perspective view of a bearing assembly according to a preferred embodiment of the invention, as assembled about a shaft;

FIGURE 2 is a sectional plan view of the bearing assembly of FIGURE 1;

FIGURE 3 is a sectional view taken substantially along line 3—3 of FIGURE 2;

FIGURE 4 is a partially exploded perspective view of a bearing assembly according to another embodiment of the invention;

FIGURE 5 is an end elevation view of the bearing assembly of FIGURE 4; and

FIGURE 6 is a sectional view taken substantially along line 6—6 of FIGURE 5.

Referring more specifically to the drawings, an antifriction bearing assembly according to a preferred embodiment is generally designated at 10 in FIGURE 1. Bearing assembly 10 comprises a split bearing mount generally designated at 11, and a split antifriction bearing generally indicated at 12 and supported by bearing mount 11. Bearing 12 may rotatably support a shaft 13 extending axially therethrough.

Antifriction bearing 12 comprises a split or two-piece annular outer race and a split or two-piece annular inner race, with a split or two-piece annular retainer and antifriction members such as balls or rollers therebetween.

The split annular outer race comprises two metallic, substantially semicircular, separable outer race segments 14, 14a whose radially disposed or diametrically opposed inner surfaces are normally secured in abutting relationship by fastener means such as screws 15, which extend substantially tangentially through corresponding wall portions of segment 14 and are threaded into corresponding holes 16 in outer race segment 14a. The outer surface 17 of outer race segment 14 is provided with recesses 20 in which the heads of the respective screws 15 are positioned so that they do not project outwardly of outer surface 17 when both race segments 14, 14a are assembled.

The outer surfaces 17, 17a of outer race segments 14, 14a are of convex arcuate form, with the arc thereof being generated about the bearing axis, but on a radius transverse thereto. In other words, when outer race segments 14, 14a are abutted to form the bearing outer race, the collective outer peripheral surface 17, 17a thereof is convexly curved to define a medial zone of a sphere centered on the bearing axis.

The inner surface of each outer race segment 14, 14a is provided with a concave race groove 21. Suitable grooves 22, 23 may be provided adjacent opposite sides of each race groove 21, each groove 22, 23 to accommodate a corresponding lubricant seal 24, 25 therein. Seals 24, 25 are each arcuately segmental in form, and each arcuate segment thereof may comprise a substantially semicircular metal member having a resilient material R in its inner portion so as to retain lubricant between the seals and in the area of the screws 15 when the bearing 12 is assembled.

The inner race of bearing 12 also comprises a pair of metallic, substantially semicircular or arcuate, inner race segments 26, 26a, whose matingly diametrically opposed end faces are secured together by fastener means such as screws 27 which extend tangentially of and penetrate corresponding portions of inner race segment 26 and are threaded into holes 30 provided in the other inner race segment 26a. The heads of the screws 27 are also positioned in suitable recesses 31 provided in the outer peripheral surface of inner race segment 26.

Inner race 26, 26a preferably includes an annular boss portion 32 projecting axially outwardly thereof beyond the axial extent of outer race 14, 14a. Inner race segments 26 26a collectively define an annular opening therethrough of a diameter corresponding to the diameter of shaft 13, and a set screw 26b may be provided in inner race segment 26 for securing the inner race on shaft 13.

The outer periphery of each inner race segment 26, 26a is provided with a race groove 33 and with seal-accommodating grooves 34, 35 which correspond, respectively, to the grooves 21, 22, 23 in outer race segments 14, 14a.

The annular retainer comprises a pair of mating metallic, substantially semicircular or arcuate, retainer segments 36, 36a which are, collectively, of substantially less external diameter than the internal diameter of outer race 14, 14a and of substantially greater internal diameter than the external diameter of inner race 26, 26a. Retainer 36, 36a is provided with an annular row of closely spaced antifriction elements, which may be in the form of balls or rollers and are shown as balls 37 in FIGURE 1. The balls 37 loosely extend through the retainer segments 36, 36a and normally ride in the race grooves 21, 33 of the respective race segments 14, 14a and 26, 26a. The segments 14, 26 36 and corresponding balls 37 constitute an arcuate segmental subassembly, releasably secured by screws 15, 27 to an arcuate segmental subassembly composed of segments 14a, 26a, 36a and corresponding balls 37.

It is apparent from the foregoing description of antifriction bearing 12 that the same may be readily assembled about and removed from shaft 13 without the necessity of placing the antifriction bearing 12 over either end of shaft 13.

Although the outer race 14, 14a; inner race 26, 26a; retainer 36, 36a; and seals 24, 25 each include two arcuate segments, and the respective abutting ends thereof are shown extending radially of the bearing axis, as is preferred, it is to be understood that each race, retainer and seal may be composed of two or more separable segments, and adjacent abutting end surfaces thereof may extend at an angle with respect to the plane of a corresponding radius line extending from the axis of the bearing, past the radially innermost edges of adjacent abutting end surfaces. Also, abutting end surfaces of adjacent segments may be of irregular, serrated or stepped configuration, provided that they mate properly.

In any event, the inner peripheral surface of each race segment and each retainer segment should extend through an arc of no more than about 180° to facilitate assembling the antifriction bearing 12 and so that the same may be placed around and removed from a corresponding shaft without the necessity of passing the bearing over either end of the shaft.

Bearing amount 11 comprises a pair of normally axially aligned juxtaposed bearing amount components 40, 40a which are separable from each other axially of bearing 12. Mount components 40, 40a may be identical to each other, although they are oppositely arranged when assembled as will be later described. Each mount component 40, 40a preferably is so constructed that it may be formed from sheet metal by utilization of suitable punches and dies. As shown, mount components 40, 40a have substantially flat proximal faces 41, 41a adapted to be secured in abutting relationship by suitable screws 42, 43 penetrating corresponding holes 44 provided in radially projecting flange portions 45 of the mount components 40, 40a and secured to a stationary frame F. The holes 44 are preferably located in diametrically opposed relationship.

Each bearing mount component is provided with an arcuate or curved flange portion 46 which projects axially outwardly with respect to the other of the mount components and which is provided with a concave inner surface 47. The configuration of the concave inner surface 47 of each mount component 40, 40a corresponds substantially to one-half of the configuration of the convex outer peripheral surfaces 17, 17a of the outer race segments 14, 14a, when viewed with respect to the mean diametrical plane of outer race segments 14, 14a. In other words, each arcuate surface 47 defines an opening whose diameter corresponds to the diameter of outer race surface 17, 17a and whose concavity is curved to mate with the curvature thereof.

Opposed ends of arcuate flange portion 46 of each mount component 40, 40a are spaced apart to define therebetween a radial notch or slot 50 which extends from the innermost to the outermost edges of each mount component 40, 40a. The slots 50 are preferably as narrow as possible, but must be at least as wide as the interior diameter of the inner bearing race 26, 26a, i.e., at least as wide as the diameter of shaft 13, so that the walls of the slots 50 may be moved astraddle shaft 13 when mounting the bearing 12 on or removing the same from the shaft 13. When the antifriction bearing unit 10 is assembled, it is preferred that the slot 50 of mount component 40 is positioned in substantially diametrically opposite relationship to the slot 50 of the mount component 40a, as shown in FIGURE 1.

When mount components 40, 40a are thus assembled, their arcuate surfaces 47 collectively form an annular bearing receiving seat slidably engaging with the outer peripheral surface 17, 17a of the outer race 14, 14a of antifriction bearing 12. Due to the spherical nature of the curvature of surface 17, 17a, and the mating curvature of the bearing receiving seat formed by surfaces 47, bearing 12 is accordingly free to move relative to bearing mount 11 for self-alignment with the axis of rotation of shaft 13.

A bearing assembly according to a modified form of the invention is shown in FIGURES 4 to 6, wherein similar parts bear similar reference characters, with the prime notation added, to avoid repetition of description already given in connenction with the embodiment illustrated in FIGURES 1 to 3.

A bearing assembly according to this embodiment is generally designated at 10' in FIGURE 4, and includes a split antifriction bearing 12' which may be identical to the bearing 12 of FIGURES 1–3. Bearing 12' is adapted to rotatably support an elongate shaft 13' extending axially therethrough, and the outer peripheral surface 17', 17a' of the outer race thereof is convexly curved to define a medial zone of a sphere centered on the bearing axis, as hereinabove described in connection with bearing 12.

Bearing assembly 10' includes a bearing mount generally designated at 11', which mount includes a plurality of mutually connected bearing mount components 60, 61 which are separable from each other radially of the bearing 12'. Bearing mount components 60, 61 have substantially flat proximal faces 62, 63 adapted to be secured in abutting relationship by suitable means such as screws 64, 65 penetrating corresponding holes 66, 67 provided in projecting flange portions 70, 71 of mount components 60, 61 respectively. Bearing mount 11' may in turn be secured to stationary frame F in any suitable manner, as by being bolted thereto as illustrated.

Bearing mount components 60, 61 collectively define an annular opening 72 extending through bearing mount 11' and defined at its perimeter by a concave bearing receiving seat 73 in bearing mount 11'. Seat 73 is curved to mate with the curvature of the outer peripheral surface 17', 17a' of the outer race 14', 14a' of bearing 12' and slidingly engages therewith. Accordingly, bearing 12' is supported by bearing mount 11', and is movable relative thereto for self-alignment with the axis of rotation of the shaft 13'.

It should be noted that each component 60, 61 of bearing mount 11' extends about bearing 12' through an arc of no more than 180° at the bearing receiving seat 73 thereof, so as to permit easy assembly and disassembly of bearing 12' therein for support thereby.

It will thus be seen that I have provided a bearing assembly for installation on a shaft without being passed over either end thereof, and including a split antifriction bearing and a bearing mount supporting the bearing for self-alignment thereof with the axis of rotation of a shaft carried thereby, thus precluding the necessity for substantially dismantling machinery to install or replace shaft supporting bearings therein.

In the drawings and specification there have been set forth preferred embodiments of the invention and, although specific terms are employed, they are used in a generic and descriptive sense only and not for purposes of limitation, the scope of the invention being defined in the claims.

I claim:
1. A split, self-aligning bearing assembly comprising a plurality of abutting but separable arcuate segmental bearing subassemblies each extending about a bearing axis through an arc of no more than 180° at the inner periphery thereof and collectively comprising an antifriction bearing having an annular inner race provided with an annular opening through the interior thereof for receiving a shaft therethrough, an annular outer race concentric with said inner race and extending thereabout and having its outer peripheral surface convexly curved to define a medial zone of a sphere centered on the bearing axis, and an annular row of antifriction elements interposed between said inner and outer races and engaging proximal surfaces thereof,
fastener means engaging and releasably maintaining said bearing subassemblies abutted with each other,
at least one annular lubricant seal extending radially between said inner and outer races of said bearing, said seal comprising a plurality of abutting but separable arcuate seal segments each extending about said inner race through an arc of no more than 180°,
a plurality of mutually connected but separable bearing mount components arranged about said bearing and collectively comprising a bearing mount having a concave, substantially annular bearing receiving seat curved to mate with the curvature of the outer peripheral surface of said outer bearing race and slidably engaging therewith to support said bearing for self-alignment thereof with the axis of rotation of a shaft supported thereby, and
means engaging and releasably maintaining said bearing mount components joined together about said bearing.

2. A structure according to claim 1, wherein each segmental bearing subassembly is substantially semicircular.

3. A structure according to claim 1, wherein said annular inner race includes an annular boss portion projecting axially outwardly thereof beyond the axial extent of said outer race, and having a set screw threadingly engaged therewith and extending substantially radially therethrough for securing said inner race to a shaft.

4. A structure according to claim 1, wherein said bearing mount components are separable radially of said bearing, with each mount component extending about said bearing through an arc of no more than 180° at said bearing receiving seat thereof.

5. A split, self-aligning bearing assembly comprising a plurality of abutting but separable arcuate segmental bearing subassemblies each extending about a bearing axis through an arc of no more than 180° at the inner periphery thereof and collectively comprising an antifriction bearing having an annular inner race provided with an annular opening through the interior thereof for receiving a shaft therethrough, an annular outer race concentric with said inner race and extending thereabout and having its outer peripheral surface convexly curved to define a medial zone of a sphere centered on the bearing axis, and an annular row of antifriction elements interposed between said inner and outer races and engaging proximal surfaces thereof,
fastener means engaging and releasably maintaining said bearing subassemblies abutted with each other.
a plurality of mutually connected but separable bearing mount components arranged about said bearing and collectively comprising a bearing mount having a concave, substantially annular bearing receiving seat curved to mate with the curvature of the outer peripheral surface of said outer bearing race and slidably engaging therewith to support said bearing for self-alignment thereof with the axis of rotation of a shaft supported thereby,
wherein said bearing mount components are separable axially of said bearing, with each mount component having a substantially radial slot therein extending from said bearing receiving seat to the outermost surface of the mount component and being of a width at least as large as the diameter of the annular opening through the interior of said inner race so as to freely pass over a shaft to be supported by said bearing, and
means engaging and releasably maintaining said bearing mount components joined together about said bearing.

References Cited

UNITED STATES PATENTS

| | | | |
|---|---|---|---|
| 2,528,987 | 11/1950 | Ablett | 308—216 |
| 2,659,636 | 11/1953 | Wheelis | 308—196 |
| 2,676,853 | 4/1954 | Shafer | 308—194 |
| 3,166,363 | 1/1965 | Kay | 308—207 |

MARTIN P. SCHWADRON, *Primary Examiner.*

FRANK SUSKO, *Assistant Examiner.*

U.S. Cl. X.R.

308—189, 194